US010413072B2

(12) United States Patent
Bock

(10) Patent No.: US 10,413,072 B2
(45) Date of Patent: Sep. 17, 2019

(54) HEIGHT-ADJUSTABLE ARMREST

(71) Applicant: BOCK 1 GMBH & CO. KG, Postbauer-Heng (DE)

(72) Inventor: Hermann Bock, Pyrbaum (DE)

(73) Assignee: BOCK 1 GmbH & Co. KG, Postbauer-Heng (DE)

( * ) Notice: Subject to any disclaimer, the term of this patent is extended or adjusted under 35 U.S.C. 154(b) by 127 days.

(21) Appl. No.: 15/473,931

(22) Filed: Mar. 30, 2017

(65) Prior Publication Data

US 2017/0280877 A1    Oct. 5, 2017

(30) Foreign Application Priority Data

Mar. 30, 2016   (DE) .................... 10 2016 105 751

(51) Int. Cl.
| A47C 7/54 | (2006.01) |
| A47C 1/03 | (2006.01) |
| F16H 21/06 | (2006.01) |
| F16H 21/44 | (2006.01) |

(52) U.S. Cl.
CPC .............. *A47C 7/54* (2013.01); *A47C 1/03* (2013.01); *A47C 7/541* (2018.08); *F16H 21/06* (2013.01); *F16H 21/44* (2013.01)

(58) Field of Classification Search
CPC ........... A47C 7/54; A47C 7/541; A47C 7/543; A47C 7/546; A47C 1/03; A47C 1/0303; A47C 1/0305; A47C 1/038; B60N 2/77
See application file for complete search history.

(56) References Cited

U.S. PATENT DOCUMENTS

| 2,668,582 | A | * | 2/1954 | Goodfellow | B60N 2/77 297/411.24 |
| 3,168,346 | A | * | 2/1965 | Rei, Jr. | B60N 2/757 297/113 |
| 3,563,604 | A | * | 2/1971 | Barecki | A47C 7/543 297/113 |
| 3,679,257 | A | * | 7/1972 | Jacuzzi | A47C 4/20 297/411.33 |
| 3,779,600 | A | * | 12/1973 | Quakenbush | B60N 2/77 297/411.3 |
| 4,244,623 | A | * | 1/1981 | Hall | A47C 1/03 297/411.36 |

(Continued)

FOREIGN PATENT DOCUMENTS

| DE | 8012342 U1 | 10/1980 |
| DE | 20106527 U1 | 9/2001 |

(Continued)

*Primary Examiner* — David R Dunn
*Assistant Examiner* — Tania Abraham
(74) *Attorney, Agent, or Firm* — Laurence A. Greenberg; Werner H. Stemer; Ralph E. Locher

(57) ABSTRACT

A height-adjustable armrest for a chair, in particular an office chair, has an arm support, which is retained by an armrest holder. The armrest holder is pivotable and a pivoting causes the armrest to be adjusted in height. An arresting device fixes the armrest holder in a height position. The arresting device is arranged at the upper, alterable-height end of the armrest holder and has a linearly movable latching element. The latching element is connected via a guide element to the armrest holder such that each pivoting movement of the armrest holder induces a linear movement of the latching element.

11 Claims, 5 Drawing Sheets

(56) References Cited

U.S. PATENT DOCUMENTS

| | | | | |
|---|---|---|---|---|
| 4,311,338 A | * | 1/1982 | Moorhouse | B60N 2/77 |
| | | | | 297/411.36 |
| 4,496,190 A | | 1/1985 | Barley | |
| 4,872,727 A | * | 10/1989 | Rye | A47C 1/03 |
| | | | | 297/411.36 |
| 6,003,927 A | * | 12/1999 | Korber | B60R 7/04 |
| | | | | 296/37.8 |
| 6,517,158 B1 | | 2/2003 | Wang | |
| 7,581,791 B2 | * | 9/2009 | Diffrient | A47C 1/03 |
| | | | | 297/115 |
| 7,677,654 B2 | * | 3/2010 | Enberg | B60N 2/753 |
| | | | | 297/115 |
| 8,967,724 B2 | * | 3/2015 | Battey | A47C 1/032 |
| | | | | 297/411.35 |
| 9,107,507 B2 | * | 8/2015 | Wallis | A47C 7/54 |

FOREIGN PATENT DOCUMENTS

| | | |
|---|---|---|
| DE | 20308116 U1 | 7/2003 |
| WO | 2004073456 A1 | 9/2004 |

* cited by examiner

HEIGHT-ADJUSTABLE ARMREST

CROSS-REFERENCE TO RELATED APPLICATION

This application claims the priority, under 35 U.S.C. § 119, of German application DE 10 2016 105 751.7, filed Mar. 30, 2016; the prior application is herewith incorporated by reference in its entirety.

BACKGROUND OF THE INVENTION

Field of the Invention

The invention relates to a height-adjustable armrest for a chair, in particular an office chair.

In the prior art, armrests are constructed usually such that the armrest holder, which carries the arm support, is fastened on a part of the chair frame, usually on the stand or the seat support. This fastening is often selected such that it is not possible for any further movement of the armrest holder to take place. In the case of height-adjustable armrests, the arm support can be adjusted in height in relation to the armrest holder, for which purpose a latching device is provided in most cases. For height-fixing purposes, a latching element then engages in a specifically provided latching recess. If, in contrast, the height of the armrest is to be adjusted, the latching element is disengaged from the latching recess. Height adjustment takes place usually linearly along the vertical in the longitudinal direction of the armrest holder.

In addition to these armrests with comparatively straight forward height-adjustment devices, which are realized usually by a telescoping action of structural elements guided one inside the other, the prior art also discloses armrests in which the arm support is connected to the chair frame via a pivotable armrest holder and the armrest is adjusted in height by virtue of the armrest holder being pivoted. If, in the case of such pivotable armrest holders, the position of the arm support, irrespective of the set height, is to remain unaltered, e.g. precisely horizontal, then the armrest holders are often configured in the form of so-called parallelogram guides, in the case of which, with the aid of four joints, the arm support can be mounted in a movable manner, such that parallelity is preserved, irrespective of the height adjustment.

In the case of height-adjustable armrests with parallelogram guides, the arresting devices for fixing the armrest holder in a defined height position have always been realized, up until now, at the lower, unalterable-height end of the armrest holder, that is to say in the stand or the seat support etc., since there is a sufficient amount of space available there for the arresting device.

The disadvantage with such a solution is that, whenever a triggering device for the height adjustment, for example a pushbutton or the like which can be actuated by the chair user, is to be provided in the arm support itself, or in the immediate vicinity of the arm support, which is usually desirable, there has to be an operative connection present, for example in the form of a linkage, a traction mechanism, for example a bowden cable, or the like, between the triggering device at the upper, alterable-height end of the armrest holder, on the one hand, and the arresting device at the lower, unalterable-height end of the armrest holder, on the other hand. For this reason, the height adjustment in such systems requires a comparatively large amount of outlay. At the same time, the necessary operative connection along the armrest holder gives rise to specifications and restrictions in respect of the design of the armrest holder itself. It is not therefore possible for the armrest holder to exhibit any desired shaping, for example shaping with extreme curvature, without a further considerable increase in the necessary design-related outlay for realizing the operative connection. It is typical in such cases either for the armrest holders to be designed in the form of components provided with cavities, wherein the linkage or the traction device is installed in the respective cavity, or for housings which encase the armrest holders to be provided, the housings giving the armrest holders a comparatively voluminous appearance.

SUMMARY OF THE INVENTION

It is an object of the present invention to provide a height-adjustable armrest for which the height adjustment can be realized in a particularly small amount of installation space.

The height-adjustable armrest contains an arm support, which is retained by an armrest holder, wherein the armrest holder is pivotable, the pivoting causing the armrest to be adjusted in height. The armrest also contains an arresting device for fixing the armrest holder in a height position. The armrest according to the invention, then, is characterized in that the arresting device is arranged at the upper, alterable-height end of the armrest holder and has a linearly movable latching element which is connected via a guide element to the armrest holder such that each pivoting movement of the armrest holder induces a linear movement of the latching element.

A core concept of the invention is that of the movement of an arresting-device component which is crucial for fixing the armrest holder in a defined height position, that is to say the movement of a linearly movable latching element, being linked to the rotary movement for the height adjustment itself, that is to say to the pivoting movement of the armrest holder, in other words for these two movements to be coupled to one another. It is preferable here for the latching element and the armrest holder to be connected to one another such that the action of the latching element being secured causes the armrest holder to be fixed in a certain height position, since prevention of the linear movement of the latching element also prevents the pivoting movement of the armrest holder. The two components are connected according to the invention by a direct connection in the form of articulation by way of a comparatively short guide element, which connects the latching element in a suitable manner to the upper, alterable-height end of the armrest holder.

The present invention provides a height-adjustable armrest for which the height adjustment can be realized in a particularly small amount of installation space. For this reason, the arresting device can be arranged in the immediate vicinity of the triggering device in the arm support, or in the immediate vicinity of the arm support, but in any case at the upper, alterable-height end of the armrest holder. There is therefore no need for an operative connection between the upper and the lower ends of the armrest holder. All the accompanying specifications and restrictions in respect of the design of the armrest holder are likewise done away with. The armrest holder may be of any desired configuration and exhibit any desired shaping, for example even shaping with extreme curvature. Doing away with the cavities allows the armrest holder to be realized by way of components which have solid cross sections. It is thus possible to design the armrest holder not just in a particularly intricate manner, but also to be of particularly high strength.

The height-adjustment device according to the invention can therefore be combined particularly advantageously with armrests of which the armrest holder is configured in the manner of a parallelogram guide for a constantly horizontal orientation of the arm support.

Other features which are considered as characteristic for the invention are set forth in the appended claims.

Although the invention is illustrated and described herein as embodied in a height-adjustable armrest, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The invention is not shown true to scale in any of the figures, the latter giving merely a schematic representation of the invention with only its essential constituent parts. Like reference signs here denote elements with identical or comparable functions.

Figure 1:
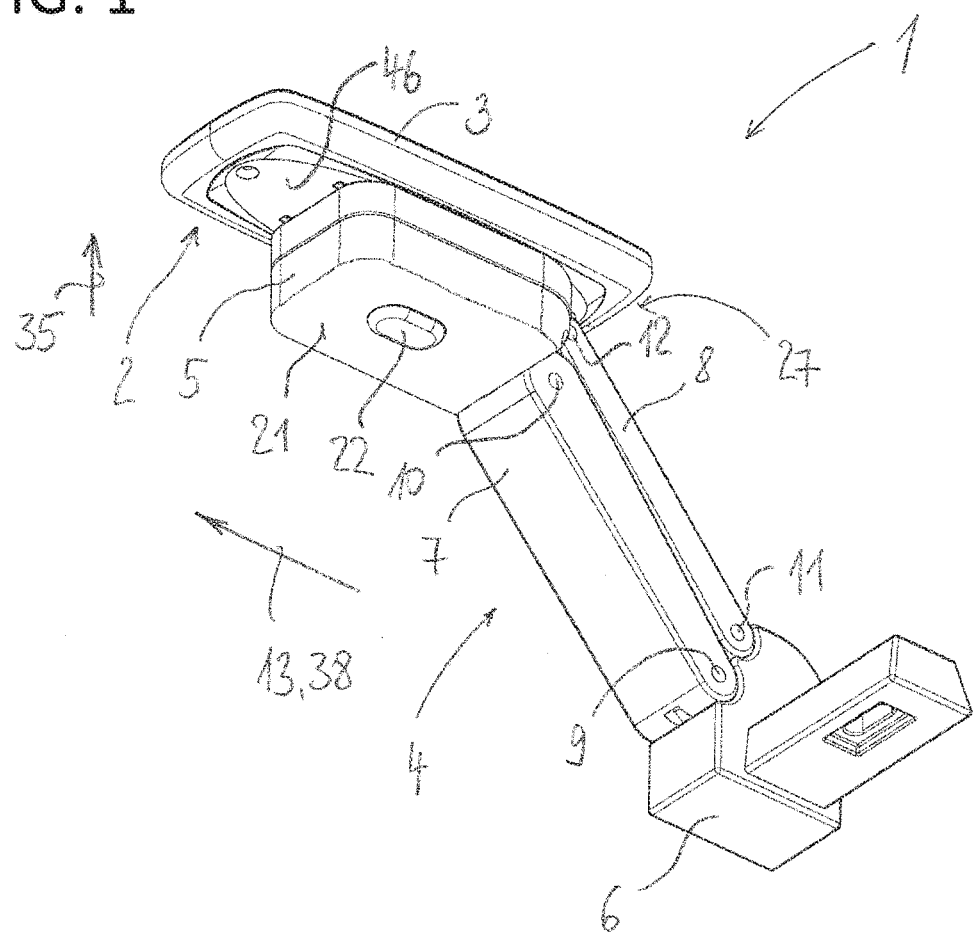
FIG. 1 is a diagrammatic, perspective view of an armrest according to the invention as seen from beneath (upper position)

Referring now to the figures of the drawings in detail and first, particularly to FIG. 1 thereof, there is shown a height-adjustable armrest 1 for a chair, in particular an office chair, which has an arm support 2 with an essentially horizontally arranged surface belonging to an arm-support padding 3, and also has an armrest holder 4, which is connected to the arm support 2. The arm support 2 here is retained by the armrest holder 4. More specifically, the armrest holder 4 is connected to an arm-support housing 5, which is arranged beneath the arm-support padding 3. The armrest holder 4 can be connected to a part of the chair frame, in this case in the form of an armrest-connecting piece 6, which can be fitted laterally on a seat support (not illustrated) of the chair.

In order for the horizontal orientation of the arm support 2 to be constant irrespective of the set height, and to remain unaltered even during the height adjustment, the armrest holder 4 is configured in the form of a parallelogram guide. The armrest holder 4 has a lower supporting arm 7 and an upper supporting arm 8, which is arranged generally parallel to the lower support arm. The supporting arms 7, 8 are articulated on the armrest housing 5, on the one hand, and on the armrest-connecting piece 6, on the other hand, in each case two joints being formed in the process. The lower supporting arm 7 here is articulated on the armrest-connecting piece 6, a lower, first pivot pin 9 being formed in the process, and on the armrest housing 5, an upper, second pivot pin 10 being formed in the process. The upper supporting arm 8 here is articulated on the armrest-connecting piece 6, a lower, third pivot pin 11 being formed in the process, and on the armrest housing 5, an upper, fourth pivot pin 12 being formed in the process. All four pivot pins 9, 10, 11, 12 here run horizontally and transversely to the longitudinal direction 13 of the chair.

Figure 3:
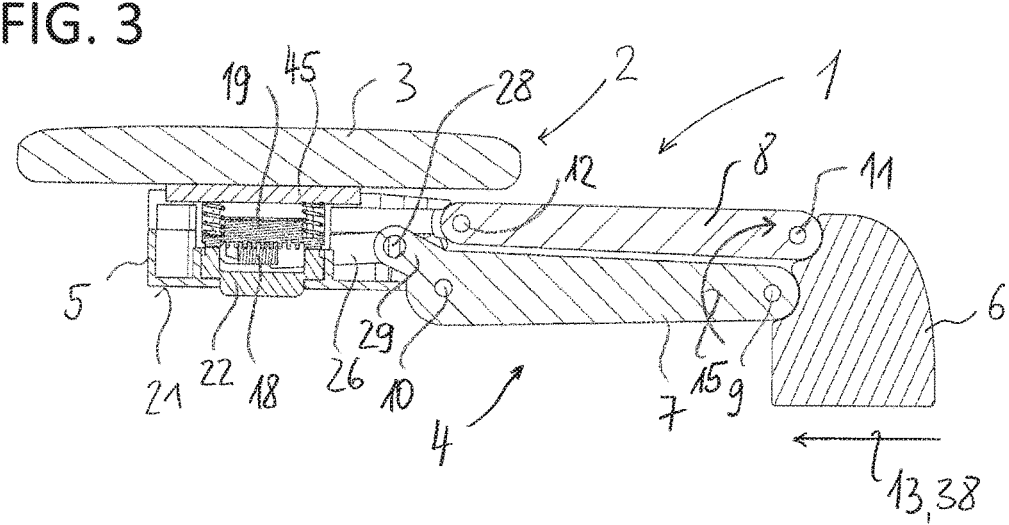
FIG. 3 is a sectional view of the armrest taken along a longitudinal direction of the arm support (lower position, locked)
Figure 4:
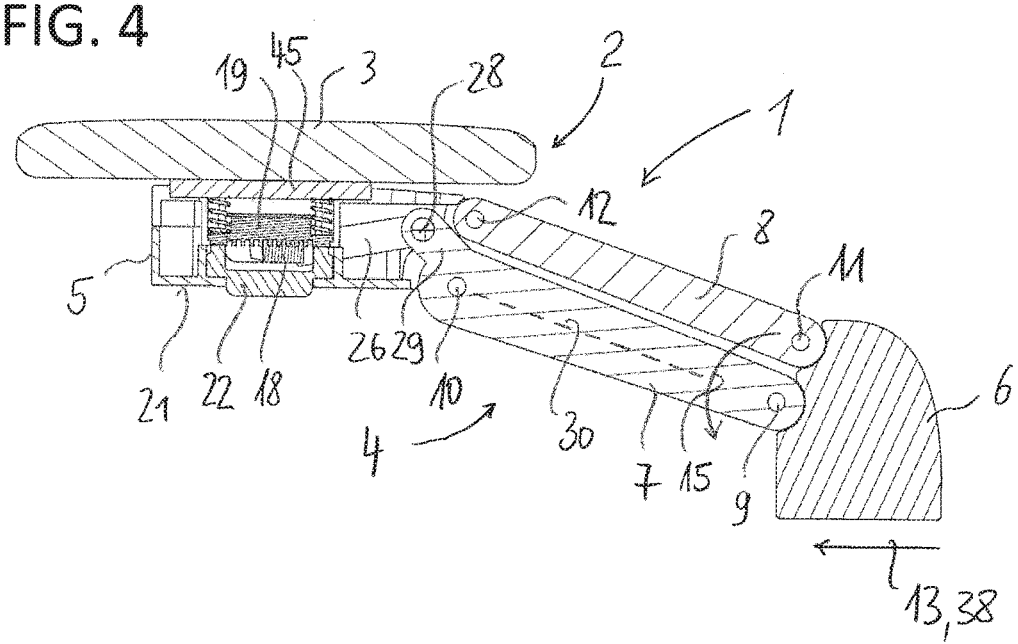
FIG. 4 is a sectional view of the armrest taken along the longitudinal direction of the arm support (upper position, locked)

Pivoting of the armrest holder 4, realized by the two supporting arms 7, 8 being pivoted in the same direction about the two lower pivot pins 9, 11 causes the armrest 1 to be adjusted in height. Depending on the pivoting direction (arrow 15), the position of the arm support 2 alters from a lower position (FIGS. 2 and 3) into an upper position (FIGS. 1 and 4) and back.

Figure 2:
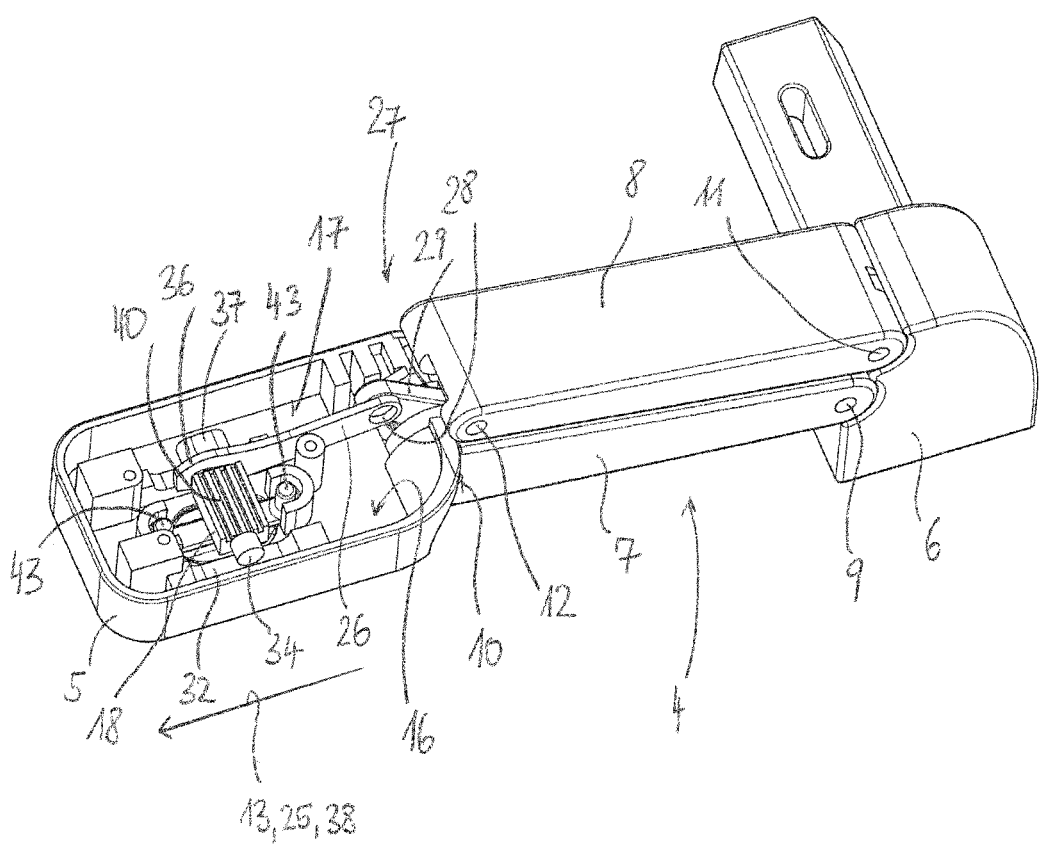
FIG. 2 is a perspective view of the armrest as seen obliquely from above, with the arm support removed and giving a view into the housing interior (lower position)
Figure 5:
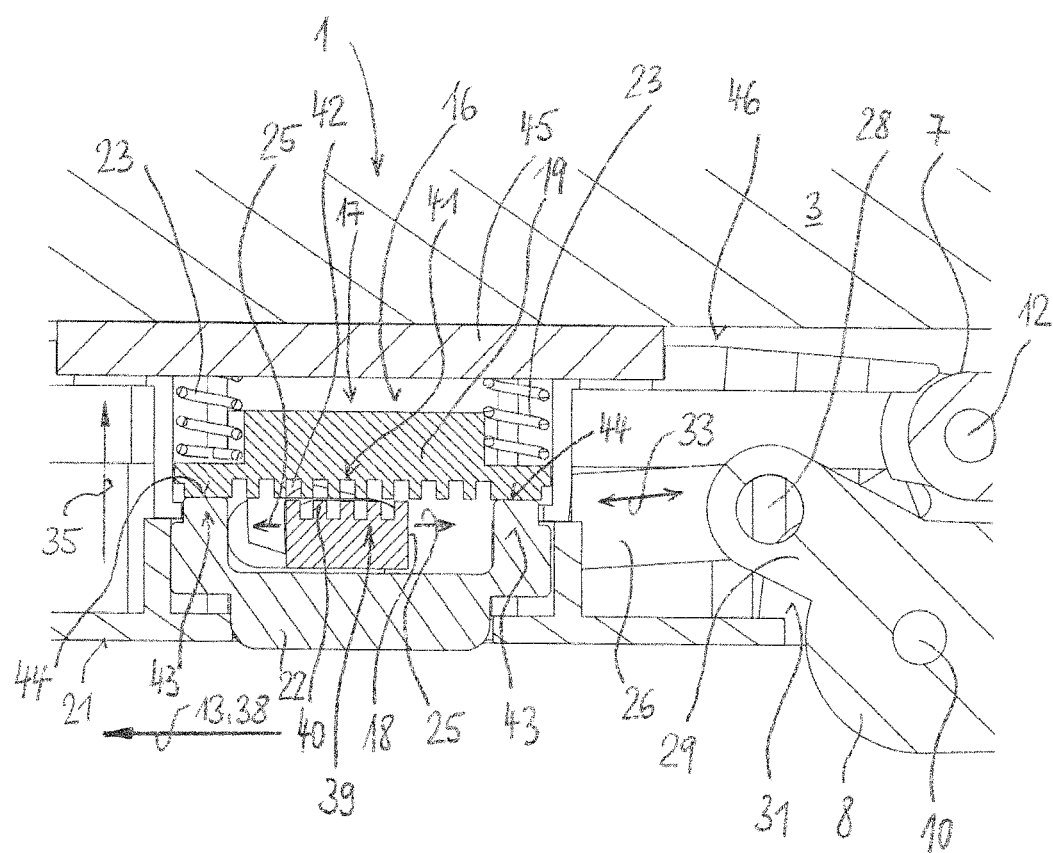
FIG. 5 is a sectional view of a detail of the armrest taken along the longitudinal direction of the arm support (lower position, unlocked).

An arresting device 17 for fixing the armrest holder 4, and thus the armrest 1 as a whole, in a defined height position is accommodated in an interior 16 of the armrest housing 5 (FIG. 2). The arresting device 17 has a linearly movable, block-form latching element 18 and a plate-form locking element 19 which is movable transversely to the latching element, interacts with the latching element 18 and, with the aid of a pushbutton 22 fitted on the underside 21 of the armrest housing 5, can be moved, counter to the spring force of a number of spring elements 23, from a locked rest position (FIGS. 3 and 4), in which the height setting is fixed, into an adjustment position (FIG. 5).

The latching element 18 is connected to the armrest holder 4 such that each pivoting movement of the lower supporting arm 7 about the first pivot pin 9 induces a linear movement of the latching element 18 (arrow 25). The coupling of the latching element 18 to the movement of the armrest holder 4 takes place here via a guide element 26, which is connected to the latching element 18. The guide element 26 is connected to the lower supporting arm 7 such that the action of securing the latching element 18 in a linear position with the aid of the locking element 19 (see FIGS. 3 and 4) causes the armrest holder 4 to be fixed at a defined height. If, on account of the position of the locking element 19, the latching element 18 cannot be displaced linearly, then it is not possible either for the height of the armrest 1 to be adjusted.

Via the guide element 26, the latching element 18 is connected in an articulated manner, for example with the aid of a trunnion, to the lower supporting arm 7 of the armrest holder 4 in the region of the upper, alterable-height end 27 of the armrest holder 4, that is to say at a link point of rotation 28, which is spaced apart from the second pivot pin 10. The link point of rotation 28 is provided by a guide arm 29 which projects out of the basic elongate shape of the lower supporting arm 7. This eccentric articulation converts any pivoting of the lower supporting arm 7 into a back and forth pushing and pulling movement 25 of the guide element 26. The link point of rotation 28 may also be provided at some other location of the lower supporting arm 7 or on the upper supporting arm 8. An arrangement in the vicinity of the upper pivot pins 10, 12 of the supporting arms 7, 8, however, is advantageous in order to minimize the necessary length of the guide element 26, and thus the amount of installation space required. Inter alia the selection of the positioning angle of the guide arm 29 in relation to the longitudinal centre axis 30 of the lower supporting arm 7 (see FIG. 4) and the selection of the length of the guide arm 29, more specifically of the distance between the second pivot pin 10 and the link point of rotation 28, can influence the desired relationship between a pivoting movement 15 of the armrest holder 4 and a linear movement 25 of the latching element 18.

The arresting device 17 is thus assigned to the upper, alterable-height end 27 of the armrest holder 4. All the essential components of the arresting device 17 here are located in the interior 16 of the armrest housing 5. It is also the case that the guide arm 29, which is fitted on the lower supporting arm 7, projects through a suitable opening 31 into the armrest housing 5 (see FIG. 5). The armrest holder 4 itself, more precisely the two supporting arms 7, 8 of the armrest holder 4, does/do not have any further structural elements of the arresting device 17. It is also the case that there are no elements of the arresting device 17 to be found on or in the armrest-connecting piece 6.

In the interior 16 of the armrest housing 5, the guide element 26 acts directly on the latching element 18 and guides the latter back and forth in a linear guide designed in the form of a forced-guidance device. For this purpose, the latching element 18 has, on its one transverse side, a stub 34, which is accommodated in a slot guide 32 in the armrest housing 5, see FIG. 2, in which the lower guide path of the linear guide 32 is illustrated. On the opposite transverse side, the latching element 18 is connected to the free end of the guide element 26. Opposite the latching element 18, the guide element 26 has an additional degree of rotary freedom. The back and forth pushing and pulling movement of the guide element 26, which is accompanied by a rotary movement, is indicated by arrow 33 in FIG. 5; the positioning angle of the guide element 26, the angle altering in dependence on the pivoting of the armrest holder 4, can be seen in FIGS. 3 and 4.

Force transmission from the guide element 26 to the latching element 18 therefore takes place, for example, such that the free end of the guide element 26 is configured in the form of a driver 36 which, in the manner of a catch, engages around a carry-along part 37 projecting out laterally on the transverse side of the latching element 18, wherein the catch, at the same time, has a suitable amount of clearance in order to ensure that the carry-along element 37 is carried along securely in any position of the guide element 26. As an alternative (not depicted), the movement of the guide element 26 is transmitted into a pure linear movement of the latching element 18 via a bore which is provided at the free end of the guide element 26 and in which engages a stub which projects, in place of the carry-along part 37, from the transverse side of the latching element 18.

The linear movement of the latching element 18 takes place parallel to the arm support 2, more specifically parallel to the longitudinal direction 38 of the arm support, the longitudinal direction 38, in the case of a typical orientation of the arm support 2, running parallel to the longitudinal direction 13 of the chair.

The latching element 18 is a passive component. It is thus merely carried along by the guide element 26. An initial movement of the latching element 18 to give rise to a pivoting movement of the armrest holder 4 as a follow-on movement, and therefore an adjustment in height, is neither envisaged nor possible.

In its height-fixing rest position, the locking element 19 is in engagement with the latching element 18, in order to secure the latching element 18 in a specific linear position, that is to say a specific displacement position during its linear movement 25 in the forced-guidance device 32. In this rest position (see FIGS. 3 and 4), a latching device 40, which are arranged on the upper side 39 of the latching element 18, engage in latching recesses 42, which are arranged correspondingly on the underside 41 of the locking element 19, and vice versa. The locking element 19 is movable transversely to the direction of the linear movement 25 of the latching element 18 (arrow 35) and, in order for the height of the armrest 1 to be adjusted, can be transferred from said rest position into an adjustment position. In this adjustment position, the locking element 19 is disengaged from the latching element 18. Transfer into the adjustment position takes place by way of actuation of the pushbutton 22, which, when actuated, acts directly on the locking element 19 and shifts the latter into the adjustment position. The adjustment force here acts counter to the spring force of the spring elements 23, which force the locking element 19 in the direction of the rest position and, when the pushbutton 22 is not actuated, ensure that the locking element remains in the rest position and also, when pressure on the pushbutton 22 is released, move the locking element 19 back again into its rest position. The spring elements 23 illustrated here are straightforward helical compression springs. Other suitable spring elements can be used instead.

As can be seen in FIGS. 2 and 5, the pushbutton 22, which is fitted on the underside 21 of the armrest housing 5, can be pushed upwards, in the direction of the arm-support padding 3, into the interior 16 of the armrest housing 5 (arrow 35). As seen in the longitudinal direction 38 of the arm support, the pushbutton 22 has front and rear, cylindrical pressure-exerting elements 43, which butt against the locking element 19, which is located above the latching element 18, and more specifically butt against the contact surfaces 44 of the locking element, the contact surfaces being provided on either side of the latching recesses 42. When the pushbutton 22 is actuated, the locking element 19 is pushed upwards, in the direction of the arm support 2, counter to the spring force of the spring elements 23, which are located opposite the pressure-exerting elements 43 of the pushbutton 22, and therefore the latching device 40 is disengaged and the latching element 18 can be moved freely back and forth, in the forward and rearward directions, in its linear guide 32. In this adjustment position, it is possible for pivoting of the armrest holder 4 to effect adjustment of the height of the armrest 1, that is to say of the distance between the arm support 2 and the armrest-connecting piece 6. As a result of the parallelogram guide, the arm support 2 always remains in its horizontal orientation. Once the desired height position of the arm support 2 has been reached, and therefore the latching element 18, in a manner corresponding to the pivoting of the armrest holder 4, is located in its desired linear position, the height-adjustment device is arrested again by virtue of pressure on the pushbutton 22 being released. The spring elements 23, which are supported on the cover 45 of the armrest housing 5, ensure that the locking element 19 returns into its starting position, in which the latching device 40 and latching recesses 42 of the locking element 19 and latching element 18 are in engagement with one another again. The abutment for the spring elements 23 may—in dependence on the construction of the arm support 2—also be provided by the underside 46 of the arm support 2 itself, in which case it is not imperative to have a housing cover 45 orienting the armrest housing 5 upwards in the direction of the arm-support padding 3.

It is also possible for the arm support 2 to be configured, for example, in a longitudinally and/or transversely displaceable manner in relation to the armrest housing 5. The mechanism which is necessary for this purpose may likewise be accommodated in the interior 16 of the arm-support housing 5.

The exemplary embodiment described shows merely one of a number of variants. It is thus possible, for example, for the arrangement of the supporting arms 7, 8 to differ from the embodiment illustrated. Instead of the parallelogram guide illustrated, it is also possible to provide an armrest holder 4 of some other design, for example with a different number and/or design of supporting arms. Instead of the pushbutton 22, it is also possible to provide some other suitable triggering device in or on the armrest housing 5. In a preferred embodiment, the armrest housing 5 is integrated, in part or in full, in the arm support 2.

All of the features illustrated in the description, in the following claims and in the drawing may be essential to the invention both on their own and in any desired combination with one another.

The following is a summary list of reference numerals and the corresponding structure used in the above description of the invention:

1 Armrest
2 Arm support
3 Armrest padding
4 Armrest holder
5 Armrest housing
6 Armrest-connecting piece
7 Lower supporting arm
8 Upper supporting arm
9 First pivot pin
10 Second pivot pin
11 Third pivot pin
12 Fourth pivot pin
13 Longitudinal direction of the chair
14 (Blank)
15 Direction of the pivoting movement, pivoting direction
16 Housing interior
17 Arresting device
18 Latching element
19 Locking element
20 (Blank)
21 Housing underside
22 Pushbutton, triggering means
23 Spring element
24 (Blank)
25 Direction of the linear movement, linear direction
26 Guide element
27 Upper end of the supporting arm
28 Link point of rotation
29 Guide arm
30 Longitudinal centre axis of the supporting arm
31 Housing opening
32 Linear guide, forced-guidance means
33 Back and forth movement of the guide element
34 Stub
35 Movement direction of the pushbutton
36 Driver
37 Carry-along part
38 Longitudinal direction of the arm support
39 Upper side of the latching element
40 Latching means
41 Underside of the locking element
42 Latching recess
43 Pressure-exerting element
44 Contact surface
45 Housing cover
46 Underside of the arm support

The invention claimed is:

1. A height-adjustable armrest for a chair, comprising:
an armrest holder;
an arm support being retained by said armrest holder, said armrest holder being pivotable, a pivoting movement causing the height-adjustable armrest to be adjusted in height;
a guide element;
an arresting device for fixing said armrest holder in a height position, said arresting device disposed at an upper, alterable-height end of said armrest holder and having a linearly movable latching element, said linearly movable latching element being connected via said guide element to said armrest holder such that each pivoting movement of said armrest holder induces a linear movement of said linearly movable latching element; and
said armrest holder configured to form a parallelogram guide such that an orientation of said arm support, irrespective of the height position, remains unaltered.

2. The height-adjustable armrest according to claim 1, wherein said linearly movable latching element is connected to said armrest holder such that prevention of the linear movement as a result of said linearly movable latching element being secured causes prevention of the pivoting movement and thus fixing of said armrest holder in the height position.

3. The height-adjustable armrest according to claim 1, wherein said guide element is connected to said armrest holder in a region of said upper, alterable-height end of said armrest holder.

4. The height-adjustable armrest according to claim 1, wherein said armrest holder has at least one supporting arm with a first end articulated on a part of a chair frame by a first pivot pin, and a second end articulated on said arm support by a second pivot pin, wherein said supporting arm is connected to said guide element in an articulated manner at a point of rotation, which is spaced apart from said first and second pivot pins, such that pivoting of said supporting arm is converted into a back and forth movement of said guide element.

5. The height-adjustable armrest according to claim 4, further comprising a guide arm, the point of rotation is provided by said guide arm which projects out of a basic elongate shape of said supporting arm.

6. The height-adjustable armrest according to claim 5, wherein said point of rotation is disposed in a vicinity of said second pivot pin and said second pivot pin being an upper pivot pin.

7. The height-adjustable armrest according to claim 1, further comprising a linear guide, said guide element acts directly on said linearly movable latching element and guides said linearly movable latching element back and forth in said linear guide, wherein the linear movement of said linearly movable latching element runs parallel to a longitudinal direction of said arm support.

8. The height-adjustable armrest according to claim 1,
further comprising a triggering device;
wherein said arresting device has a locking element which, in a height-fixing rest position, is in engagement with said linearly movable latching element; and
wherein in order for a height of the height-adjustable armrest to be adjusted by actuating of said triggering device, said locking element can be shifted from the rest position into an adjustment position, in which said locking element is disengaged from said linearly movable latching element, wherein said locking element can be moved transversely to a direction of the linear movement of said linearly movable latching element.

9. The height-adjustable armrest according to claim 8, further comprising at least one spring element acting on said locking element and ensuring that said locking element remains in the rest position.

10. The height-adjustable armrest according to claim 9, wherein said triggering device has a pushbutton which, when actuated, acts on said locking element and shifts said locking element counter to a spring force of said at least one spring element, into the adjustment position.

11. The height-adjustable armrest according to claim 1, wherein the height-adjustable armrest is for an office chair.

* * * * *